United States Patent [19]

Wu

[11] 4,402,147
[45] Sep. 6, 1983

[54] SHOE HAVING AUTOMATIC STEP COUNTER

[76] Inventor: Chyuan-Jong Wu, 2/F, No. 17-1, Lane 52, I-Tung St., Taipei City, Taiwan

[21] Appl. No.: 267,630

[22] Filed: May 27, 1981

[51] Int. Cl.³ .............. A43B 23/00; G01C 22/00
[52] U.S. Cl. ........................................ 36/136; 235/105
[58] Field of Search ..................... 36/136; 235/105

[56] References Cited

U.S. PATENT DOCUMENTS

| 3,898,886 | 8/1975 | Hamm | 235/105 |
| 4,019,030 | 4/1977 | Tamiz | 36/136 |
| 4,220,996 | 9/1980 | Searcy | 235/105 |

FOREIGN PATENT DOCUMENTS 2855736  6/1979  Fed. Rep. of Germany ...... 235/105

*Primary Examiner*—Patrick D. Lawson
*Attorney, Agent, or Firm*—Cushman, Darby & Cushman

[57] ABSTRACT

In the sole the invention assembles a piece of electronic counter which can automatically accumulate the steps when walk. It includes a piece of touch stick which will be compressed for the action of walking with interval, apiece of knowing stick which compresses with interval to produce electronic sign, a set of apparatus which arranges above every electronic sign to be a stable electric circuit of pulse, and a set of apparatus can make electronic counter select the above-number or below-number.

19 Claims, 3 Drawing Figures

4,402,147

SHOE HAVING AUTOMATIC STEP COUNTER

BACKGROUND OF THE INVENTION

The present invention relates to a device for determining the number of steps walked. On Aug. 11, 1980 I have applied for a patent on THE SHOE WITH AUTOMATIC COUNTER having Ser. No. 06/176,764. In that case, the shoe was completely assembled and included a mechanical digital-gear, the present invention on the other hand uses an electronic circuit and digital display. Thus, the present invention is lighter.

SUMMARY OF THE INVENTION

The chief purpose of this invention is survey certain walking-distances to accumulate, that is count, the steps. The device is assembled in the shoe-toe and includes a digital display in the instep of shoe-toe, a contact-carrying insulating board in the sole which will move downwardly as sole and ground contact; as the shoe lifts from the ground it moves upwardly by the power of a spring or the like, that is, the board moves up and down in cycles by the action of walking, and an electronic circuit produces an electronic signal according to the above described every step. The above electronic signal is fed to a stable electronic counter which selects an upper value or a lower value number, that is counts up or down.

DESCRIPTION OF THE PREFERRED EMBODIMENT

Figure 1:
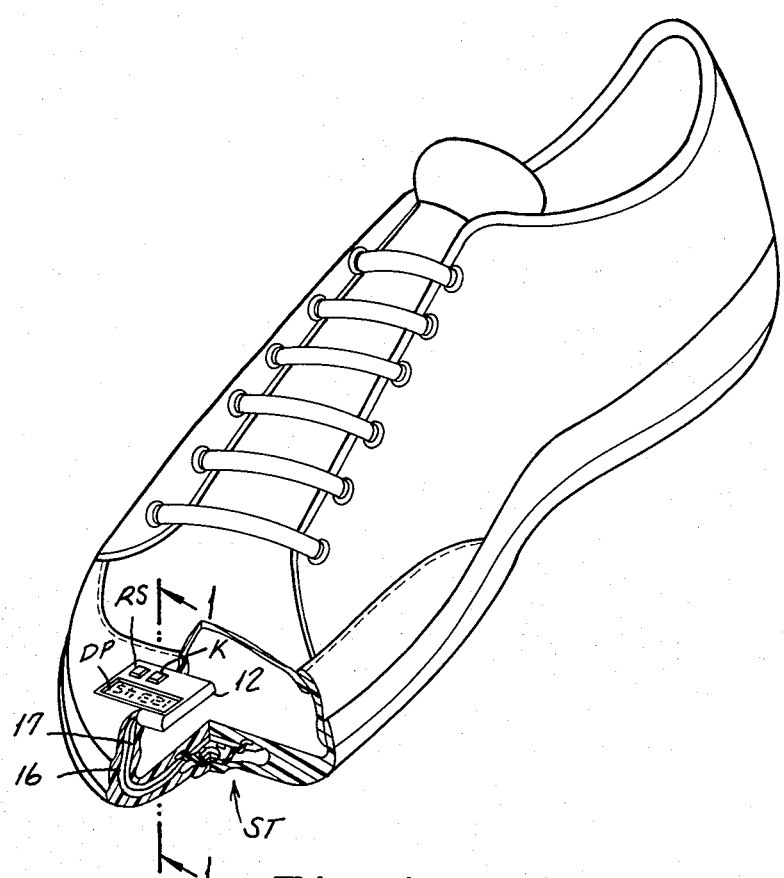
FIG. 1 is a perspective view of a shoe which illustrates the location of the circuitry and display in accordance with the present invention.
Figure 2:
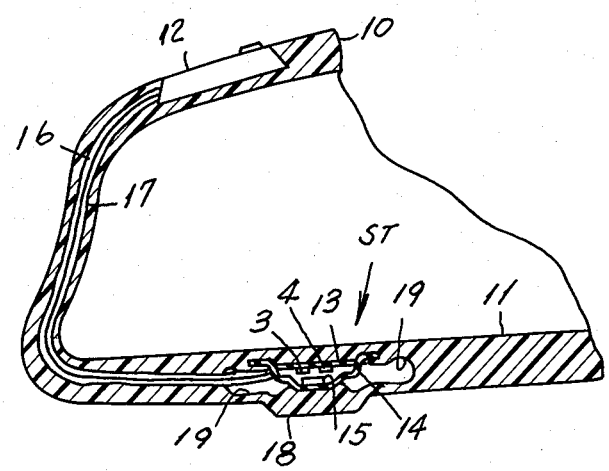
FIG. 2 is a cross sectional view taken along lines 1—1 of FIG. 1 to reveal the location of the circuitry and display.

As shown in FIG. 1, a digital display DP is installed on the toe instep. A counter switch ST is placed on the outside, or as shown within the sole 11, and at another section there is fixed a housing 12 for the digital display DP which can be viewed from an upper, front portion of the shoe. On the digital display DP there is a movement switch K and a reset switch RS. As FIG. 2 shows, the counter switch ST includes an insulating board 13 which supports two contacts 3, 4 also shown in FIG. 3. Therebelow, an insulating rubber-piece 14 is disposed, having elasticity. (The insulating rubber-piece 14 is often used in a commercial key board.) The insulating rubber 14 supports a contact 15. The two contacts 3, 4 communicate through insulated wires 16, 17 to the display DP housing 12. The bottom face of the insulating rubber-piece 14 connects to a convex or thick section 18 of the shoe sole. Around the convex or thick section 18 there is a roll shaped (donut) space 19. When walking, the convex or thick section 18 is compressed to make the contact 15 and the contacts 3, 4 touch and define an ON condition. When lifting the shoe, the insulating rubber 14 and the elasticity of the convex or thick section 18 remove the contact 15 from the contacts 3, 4 providing an OFF condition.

Around the shoe-toe there is a digital switch ST. When walking a step, the ST is compressed ON and a signal is passed.

Figure 3:
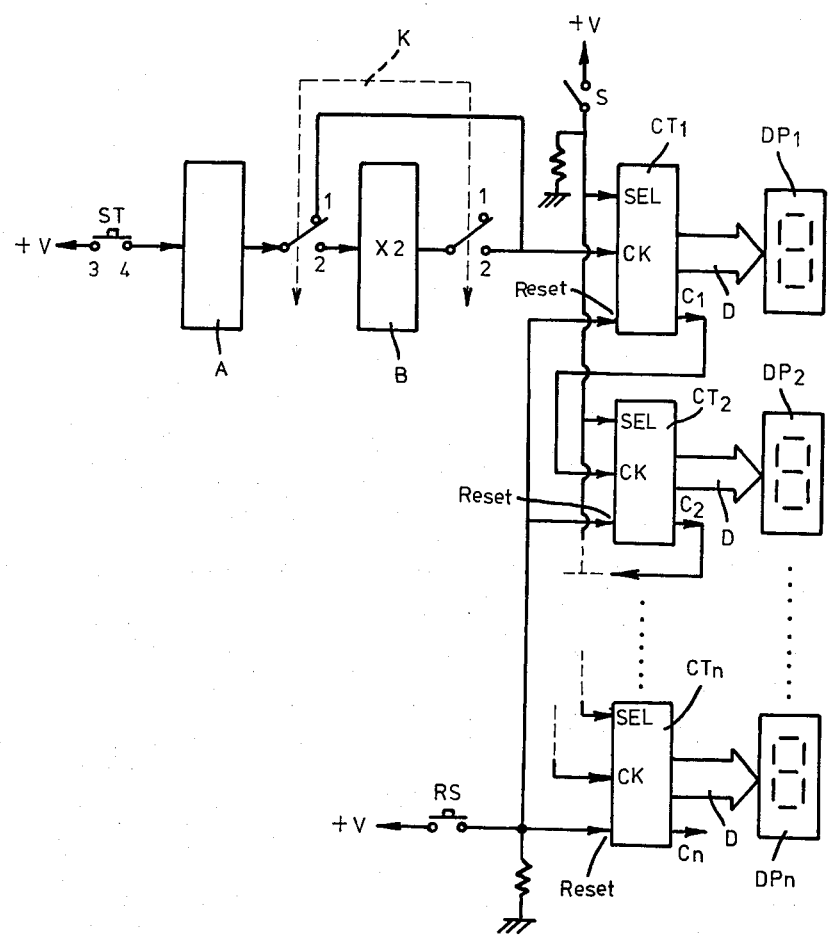
FIG. 3 is a block diagram which reveals a preferred form of an electronic circuit and display suitable in practicing the invention.

K includes an alternative movement switch of two paths. When the switch K is at the location 1 as FIG. 3 shows, the A output causes the signal to be fed directly into CT1. If K is at the location 2, the signal will first come into a amplifier B, then the output and be fed into CT1.

B is a multiplier which multiplies by 2 so that for every one signals that come therein, it will output two into the CT1. this can be effected by providing a signal upon passage for the leading and trailing edge of each pulse from the switch ST.

A is a stable electric circuit which passes a signal from switch ST and becomes a pulse-wave signal which is time stable.

CT1 to CTn is a counter having a BCD output from "0000" and counts to "1001" then inputs a signal to the next higher digit display output will return "0000" and so on until the display reads 999. Output C1 to Cn clocks the next stage of the counter and thus will produce an output indicative of the number of steps.

The reset of CT1 to CTn clears the stages CTn and the display output goes to zero.

The SEL is a alternative input for setting stages CT1-CTn to either count down or up. If it is high, it counts up. If it is low it counts down. As the outputs go from "0000" to "1001", C1 to Cn will produce a forward-signal to the next stage.

DP1 to DPn is a digital display of each, being of the 7-segment type.

As above expressed, CT1 produces a pulse signal, the (digital display) DP1 to DPn reveals the digit that will minus 1 or plus 1 for each received pulse. If switch K is at the location 1 the digit of DP1 to DPn will plus 1 (or minus 1) every walking-step. If K is at the location 2 then will plus 2 (or minus 2) every two walking-steps. By deciding in advance how many steps one wishes to take, setting the circuit so that the number is set on the display DP1 to DPn and setting the switch RS so that the counter will count down, a user can observe how many steps he has yet to take.

What I claim is:

1. A shoe comprising a sole and an upper, switch means operatively arranged to produce an electrical signal in response to a user taking a step, an electronic counter means for counting electrical signals from said switch means, and electronic display means responsive to output from said counter means.

2. A shoe according to claim 1, wherein said counter means includes selecting means for setting said counter means to count up or count down.

3. A shoe according to claim 1 or 2, including multiplying means responsive to each signal from said switch means for producing two signals for each signal received from said switch means.

4. A shoe according to claim 3, including further switch means for selectively bypassing said multiplying means.

5. A shoe according to claim 1 or 2, wherein said display means is a digital display.

6. A shoe according to claim 5, wherein said digital display is of the seven segment type.

7. A shoe according to claim 1 wherein said switch means comprises:

a resilient deformable cavity formed in said sole;

a protruding portion of said sole, underlying said cavity; and adapted to temporarily deform said cavity during a step with said shoe;

at least first and second electrically conductive contacts, disposed within said cavity such that said contacts are electrically separated when said cavity is undeformed and an electrical connection between said contacts is effected by deformation of said cavity.

8. A shoe according to claim 7 wherein said first contact is disposed on the upper portion of said cavity, and said second contact is disposed on the lower portion of cavity overlying said protruding portion of said sole.

9. The shoe of claim 7 or 8 wherein said switch means further comprises a resilient member disposed within said cavity to facilitate separation of said contacts.

10. The shoe of claim 7 or 8 wherein said switch means further includes an insulative member disposed in said cavity for mounting said first contact.

11. The shoe of claim 10 wherein said switch means further comprises a resilient member disposed within said cavity to facilitate separation of said contacts.

12. A shoe according to claim 10 wherein said switch means includes a third electrically conductive contact disposed on said insulative member, offset from said first contact, but at least partially overlying said second contact, whereby said second contact selectively completes an electrical connection between said first and third contacts.

13. The shoe of claim 12 wherein said switch means further comprises a resilient member disposed within said cavity to facilitate separation of said contacts.

14. The shoe of claim 1 or 7 wherein said electronic counter means comprises a BCD counter including a plurality of elements, each counter element corresponding to a decimal digit; and said electronic display means comprises a plurality of seven segment display elements, each coupled to an associated BCD counter element.

15. The shoe of claim 7 or 8 wherein said switch means further comprises a pulse shaping circuit connected to at least one of said first and second contacts.

16. Apparatus comprising:

switch means, adapted for disposition on a shoe, for generating a pace signal in response to each step with said shoe; and an electronic device, responsive to said pace signal and including:

BCD counter means, responsive to said pace signals including a plurality of elements, each element corresponding to a decimal digit, for generating a BCD count indicative of the number of paces taken with said shoe; and display means, including at least one display element corresponding to each said BCD counter elements, for providing visual indicia of said count.

17. The apparatus of claim 16 wherein said BCD counter means comprises a presetable down-counter, adapted to initially contain a predetermined count said predetermined count being decremented in response to each said pace signal.

18. The apparatus of claim 16 or 17 wherein said electronic device further comprises:

multiplier means, for generating two output signals in response to each input signal applied thereto; and means for selectively interposing said multiplier means between said switch means and said BCD counter means, to vary said BCD count by two units in response to every pacer signal.

19. The apparatus of claims 16 or 17 wherein said switch means is formed as an integral part of said shoe.

* * * * *